US008798993B2

(12) United States Patent
Kechichian et al.

(10) Patent No.: US 8,798,993 B2
(45) Date of Patent: Aug. 5, 2014

(54) SPEECH DETECTOR

(75) Inventors: Patrick Kechichian, Eindhoven (NL); Cornelis Pieter Janse, Eindhoven (NL); Rene Martinus Maria Derkx, Eindhoven (NL); Wouter Joos Tirry, Wijgmaal (BE)

(73) Assignee: NXP, B.V., Eindhoven (NL)

( * ) Notice: Subject to any disclaimer, the term of this patent is extended or adjusted under 35 U.S.C. 154(b) by 352 days.

(21) Appl. No.: 12/950,711

(22) Filed: Nov. 19, 2010

(65) Prior Publication Data

US 2011/0288864 A1 Nov. 24, 2011

(30) Foreign Application Priority Data

Nov. 20, 2009 (EP) .................................... 09252662

(51) Int. Cl.
*G10L 15/20* (2006.01)

(52) U.S. Cl.
USPC .......................................................... 704/233

(58) Field of Classification Search
USPC ................................................. 704/233, 237
See application file for complete search history.

(56) References Cited

U.S. PATENT DOCUMENTS

| | | | | |
|---|---|---|---|---|
| 7,167,568 | B2 * | 1/2007 | Malvar et al. | 381/66 |
| 2006/0013412 | A1 * | 1/2006 | Goldin | 381/94.1 |
| 2009/0175466 | A1 * | 7/2009 | Elko et al. | 381/94.2 |
| 2011/0313763 | A1 * | 12/2011 | Amada | 704/233 |

FOREIGN PATENT DOCUMENTS

EP 1 923 866 A1 5/2008

OTHER PUBLICATIONS

Rubio, J. E. et al. "Two-Microphone Voice Activity Detention Based on the Homogeneity of the Direction of Arrival Estimates", IEEE International Conference on Acoustics, Speech, and Signal, pp. IV-385-IV-388 (Apr. 2007).

Song, H. et al. "First-Order Differential Microphone Array for Robust Speech Enhancement", IEEE Audio, Language and Image Processing, pp. 1461-1466 (Jul. 2008).

Elko, G. W. et al. "A Simple Adaptive First-Order Differential Microphone", IEEE Applications of Signal Processing to Audio and Acoustics, pp. 169-172 (1995).

Luo, F.-L. et al. "Adaptive Null-Forming Scheme in Digital Hearing Aids", IEEE Transactions on Signal Processing, vol. 50, No. 7, pp. 1583-1590 (Jul. 2002).

Elko, G. W. "Acoustic Signal Processing for Telecommunication—Superdirectional Microphone Arrays", Kluwer Academic Publishers, Higham, MA pp. 181-238 (2000).

Extended European Search Report for Patent Appln. No. 09252662.3 (May 12, 2010).

* cited by examiner

*Primary Examiner* — Jakieda Jackson

(57) ABSTRACT

A method for detecting speech using a first microphone adapted to produce a first signal (x), and a second microphone adapted to produce a second signal ($x_2$), the method comprising the steps of:

(i) applying gain to the second signal to produce a normalised second signal, which signal is normalised relative to the first signal;
(ii) constructing one or more signal components from the first signal and the normalised second signal;
(iii) constructing an adaptive differential microphone (ADM) having a constructed microphone response constructed from the one or more signal components which response has at least one directional null;
(iv) producing one or more ADM outputs ($y_f$, $y_b$) from the constructed microphone response in response to detected sound;
(v) computing a ratio of a parameter of either a first signal component or a constructed microphone response to a parameter of an output of the ADM;
(vi) comparing the ratio to an adaptive threshold value;
(vii) detecting speech if the ratio is greater than or equal to the adaptive threshold value.

16 Claims, 6 Drawing Sheets

SPEECH DETECTOR

This application claims the priority under 35 U.S.C. §119 of European patent application no. 09252662.3, filed on Nov. 20, 2009, the contents of which are incorporated by reference herein in their entirety.

This invention relates to a speech detector, and particularly, but not exclusively to a speech detector comprising a plurality of microphones closely-spaced to one another, to a method for detecting speech using a plurality of microphones, and to an adaptive differential microphone forming a speech detector.

BACKGROUND OF THE INVENTION

The term "closely-spaced" as used herein to describe the position of microphones relative to one another means that the distance between adjacent microphones in an array is very much less than the distance between a microphone and a sound source detected by the microphone. Furthermore, within the frequency bands of interest, the wavelengths of sound will be longer than the spacing between the microphones.

A known speech detector using two microphones makes use of binaural cues such as the inter-microphone level differences (ILD) to detect speech. In order to make use of ILD it is necessary to assume that the speech to be detected is louder on one microphone than the other. This assumption places a constraint on the positioning of the two microphones on a device such as a mobile phone.

It is known that many speech enhancement algorithms make use of such a detector in order to operate. These speech enhancement algorithms, that make use of more than one microphone, often rely on a generalised sidelobe canceller which consists of a beamformer to capture a target sound source, and a second stage adaptive filter to remove any undesired sounds from the beamformer output without attenuating the target sound source.

Such a building block relies heavily on the availability of a speech detector which can control the adaptation of the beamformer and second stage filter correctly.

If target speech is detected, then only the beamformer will adapt, while in the absence of the target speech, only the second stage adaptive filter will adapt.

Poor performance of such a known speech detector can lead to suppression of the target signal and reinforcement of interfering (for example background) sources. Such poor performance can result in a two microphone speech enhancement system that has a performance that is worse than that of a single microphone system.

It is known that the design of a speech detector is usually governed, inter alia by a specific application and by design constraints. The way a speech detector is to be used in a specific application can be based on a priori information about the position of the speaker and any interfering sound sources.

In hearing aid applications, for example, the desired sound sources can be assumed to be located in front of the person wearing the hearing aid (a forward direction), while interfering sources are assumed to originate from behind the wearer of the hearing aid (a backward direction).

If a device in which the microphones are incorporated is positioned sideways on to a sound source, then the sound source is described as being a broadside sound source. Similarly, if the sound source is directed towards an end of the device containing the microphones the sound source is described as being in the end fire position. When considering the position of a sound source with respect to a linear microphone array and depending on the application, it is usual sources to describe directed towards one end of the array as being in the forward plane, and those directed towards the other end of the array as being in the backward plane.

The forward and backward planes are sometimes defined as the forward half plane and the backward half plane since they each span an angle of 180°, a whole plane would define 360°. Further, the location of a sound source is defined by $\theta$, the azimuthal angle. This is the angle of incidence of the sound source relative to a central point of the array.

Design constraints such as the position of the microphones on the device also determine the information about desired/undesired sound sources that can be used, given a specific topology of the device, and the microphone positions on the device.

For example, in a known mobile phone having two microphones, a primary microphone is placed at the base of the device, and a secondary microphone is placed at the top and on a rear side of the device. The secondary microphone is thus further away from a user's mouth than the primary microphone.

With such a microphone topology, speech originating from the user of the mobile phone is in the near-field and is louder on the primary microphone than on the secondary microphone. Background noise and other noise interference sources are in the far field and are thus equally loud on both microphones. By exploiting the inter-level difference between each of the microphones, the target speech may be properly detected.

In a known speech detector comprising a plurality of closely-spaced microphones, a common detection technique is to first apply differential processing to the microphone signals. This procedure produces forward and backward facing cardioid signals using two omnidirectional microphones, assuming that the microphones are closely spaced. If the target sound sources are assumed to originate from the forward direction, for example, then the ratio between the powers on the forward and backward cardioid microphones should be very large. For interfering sources originating from the backward direction, this ratio will be very small, while for diffuse noise, the ratio should be close to unity.

This forward-backward cardioid processing of microphone signals is a commonly used detection method with closely-spaced microphones. A problem with this type of detector is that it is not able to easily adapt to different microphone configurations or to different ways that the device may be handled by the user. In other words, this type of detector is not suitable in situations where the speech does not originate from the forward direction.

This can be a particular problem with mobile phones, for example, because a user may change the orientation of the phone relative to the mouth of the user and thus speech will not necessarily always originate from a forwarded direction relative to the microphone.

Another problem with known speech detectors of this type is that it is necessary to match the power of each microphone within a particular tolerance. In other words, it is necessary to calibrate the microphones.

According to a first aspect of the present invention there is provided a method for detecting speech using a first microphone adapted to produce a first signal and a second microphone adapted to produce a second signal, the method comprising the steps of:

(i) applying gain to the second signal to produce a normalised second signal, which signal is normalised relative to the first signal;

(ii) constructing one or more signal components from the first signal and the normalised second signal;

(iii) constructing an adaptive differential microphone (ADM) having a constructed microphone response constructed from the one or more signal components which response has at least one directional null;

(iv) producing one or more ADM outputs from the constructed microphone response in respect to detected sound;

(v) computing a ratio of a parameter of either a first signal component or a constructed microphone response to a parameter of an output of the ADM;

(vi) comparing the ratio to an adaptive threshold value;

(vii) detecting speech if the ratio is greater than or equal to the adaptive threshold value.

According to a second aspect of the present invention there is provided a speech detector comprising:

a first microphone adapted to produce a first signal;

a second microphone adapted to produce a second signal;

an amplifier adapted to apply a gain to the second signal to produce a normalised second signal, which signal is normalised relative to the first signal;

a first processor for constructing one or more signal components from the first and normalised second signals;

a second processor for constructing an adaptive differential microphone having a constructed microphone response comprising at least one directional null, the ADM producing one or more outputs in response to detected sound;

a third processor for computing the ratio of a parameter of either a first signal component or a constructed microphone response to a parameter of an output of the ADM;

a comparator for comparing the ratio to an adaptive threshold to detect if the ratio is greater than or equal to the value of the adaptive threshold; and a detector for detecting speech when the ratio is greater than, or equal to the value of adaptive threshold.

According to a third aspect of the present invention there is provided an adaptive differential microphone (ADM) forming a speech detector according to a second aspect of the present invention.

Because the constructed microphone response of the ADM comprises at least one directional null, by means of embodiments of the present invention it is possible to substantially suppress a target sound source, such as target speech by directing the null to the source of the target speech. If the directional null is directed in this way, the one or more outputs of the ADM will be small since the target speech will be substantially suppressed. This means that the ratio formed between a parameter of either a first signal component or a constructed microphone response to the parameter of an output of the ADM will be large. When the ratio is greater than or equal to the adaptive threshold value then speech will be detected.

If, on the other hand, the null is directed towards background, or interference sound, then the influence of the null will be less, and as a result, the ratio formed between a parameter of either a first signal component or a constructed microphone response to the parameter of an output of the ADM will be much smaller than for the target speech. This in turn means the ratio will be less than the value of the adaptive threshold resulting in no speech being detected.

This is because, if a user is in the near-field, then sound emanating from his mouth is more direct and usually has a higher power than other sound sources in the environment of the adaptive differential microphone. Therefore, if a null is steered in the direction of the user's mouth, the ADM can suppress a large part of the signal. This means that the ADM signal will be much smaller than the signal component or the constructed microphone response.

For diffuse noise and point interference(s), the ratio will be below the threshold, and no speech will be detected.

The method according to the first aspect of the invention may comprise a further step of estimating a value of an adaptive factor $\beta$.

The adaptive threshold is determined by an adaptive factor $\beta$ as will be explained in more detail hereinbelow. The adaptive factor $\beta$ also determines the orientation of the directional null as also explained hereinbelow. The orientation of the directional null and the value of the adaptive threshold are thus both determined by the adaptive factor $\beta$.

Because both the orientation of the directional null and the adaptive threshold are both dependent upon the value of $\beta$, the threshold is in effect tailored to the current value of $\beta$ which determines the response of the ADM.

The method according to the first aspect of the present invention may comprise the following further steps:

(viii) adapting the value of the adaptive factor $\beta$;

(ix) recomputing the ratio;

(x) comparing the recomputed ratio to an adapted threshold value;

(xi) detecting speech if the ratio is greater than the adapted threshold value.

By adapting the value of the adaptive factor $\beta$ as appropriate, the directional null may be appropriately steered towards a target speech source. This will result in the target speech source being substantially suppressed by the ADM and will result in the ratio being greater than or equal to the adaptive threshold value, thus resulting in speech being detected.

Due to the adaptive nature of embodiments of the invention, the value of $\beta$ may be varied as appropriate in order to ensure that the directional null is appropriately oriented.

In embodiments of the invention the ratio may be formed by comparing the power of either a signal component or a constructed microphone response to the power of an output of the ADM.

In other embodiments of the invention, the ratio may be formed by comparing other parameters such as the absolute values of either a signal component or a constructed microphone response to the absolute value of an output of the ADM. If such a ratio is used, the adaptive threshold will need to be modified accordingly.

The output of the ADM may comprise a first output $y_b$ produced in response to sound detected in the back plane, and a second output $y_f$ produced in response to sound detected in the front plane. In such embodiments, a ratio may be calculated in respect of each of the outputs of the ADM separately. Depending on the value of the two ratios, a decision can be made as to whether a speech source is positioned in the forward or backward plane.

For a speech detector that is part of a hand set such as a mobile phone, the near-field effects of propagating waves are predominant. Far field effects, which are usually valid for hands free scenarios, are commonly assumed for the analysis of small microphone arrays. In particular, assumptions of planar wave fronts and equal microphone levels facilitate the construction of so called eigenbeams for closely-spaced microphones.

Using two microphones, these eigenbeams correspond to a monopole and a dipole. Combinations of these eigenbeams can produce various first-order differential responses.

In one embodiment of the invention, two signal components are constructed from the first and normalised second signals. However, in other embodiments, more than two signal components may be constructed.

In some embodiments of the invention the first signal component comprises a monopole signal.

In such embodiments, or in other embodiments, the second signal component may comprise a dipole signal.

The constructed microphone response may take any particular form as long as it comprises a null. A null is defined as part of a signal where the response is zero.

Preferably, the constructed microphone response comprises a first response and a second response.

In embodiments of the invention, the first response comprises a forward facing cardioid signal, and the second response comprises a backward facing cardioid signal.

In such an embodiment, the forward and backward cardioids are used to adaptively construct a microphone response containing a null in the direction of a strong point source particularly a source of speech. However, these forward and backward cardioids are themselves constructed from the aforementioned eigenbeams (the monopole and dipole), and as such the fundamental shapes which can produce all other first-order shapes are the monopole and dipole.

Such an embodiment of the invention offers a natural and more general extension to the backward-forward cardioids detector.

In other embodiments of the invention the first and second responses may comprise oppositely facing first-order response signals, for example.

The first and second microphones produce a first and a second signal respectively in response to sound emanating from one or more sound sources, which sound is detected by one or both of the microphones.

The second signal is then normalised relative to the first signal by applying a gain to the second signal. The gain may be either positive or negative.

By means of embodiments of the invention, it is thus not necessary to calibrate the first and second microphones since the second signal is normalised relative to the first signal before speech is detected.

The first and second microphones may be any desired type of microphone, and in some embodiments of the invention they each comprise an omnidirectional microphone.

In order to further understand the invention, the nature of first-order differential microphones will now be considered with respect to an embodiment of the invention in which the constructed microphone response comprises forward and backward facing cardioids, and the first and second signal components comprise a monopole and dipole signal respectively.

A forward and backward facing cardioid can be constructed assuming that the microphones are closely-spaced (this equates to the condition $kd \ll \pi$, where $k=w/c$ is the wave number, d is the distance between the microphones, c is the speed of sound and w is the angular frequency of the sound).

The general form for oppositely-facing first-order superdirectional responses is:

$$Vf=\alpha Vm+(1-\alpha)\overline{V}d \quad (1)$$

$$Vb=\alpha Vm-(1-\alpha)\overline{V}d \quad (2)$$

where α determines the resulting first-order response). Specifically, for $0<\alpha\leq 0.5$, the directional response contains at least one null. α therefore controls the location of the null (or nulls) in the first-order microphone response, with the monopole response Vm, and the normalized dipole response $\overline{V}d$ is given by $$\overline{V}d = \frac{1}{jw}\frac{c}{d}Vd \quad (3)$$

where $V_d$ is the dipole response. The term 1/(jw) is the (ideal) integrator response, and c/d is a normalization factor. Ideally, (1) and (2) simplify to $$V_f=0.5(1+\cos\theta)$$

$$V_b=0.5(1-\cos\theta) \quad (4)$$

for forward- and backward-facing cardioids ($\alpha=0.5$), where θ is the azimuthal angle defining the location of the sound source and is frequency-independent for small microphone spacings.

As mentioned hereinabove, the fundamental building blocks of the forward and backward cardioids are combinations of the monopole and dipole signal which are dependent on the α factor. The values of α will be different for other first-order microphone responses. In other words, the shape of the first-order response depends on the value of α.

The subscripts f and b refer to the forward plane and the backward plane respectively, and θ is the angle of incidence for the sound source. These variables are illustrated in FIGS. 1 and 2, where $M_1$ denotes a first microphone, $M_2$ denotes a second microphone, r is the distance of the sound source from the first microphone, $r_2$ is the distance of the sound source from the second microphone, and r is the distance of the sound sources from the centre of the array.

The directivity factor (Q) for a first-order (normalized) differential microphone can be expressed in terms of α with $$Q(\alpha) = \frac{3}{4\alpha^2 - 2\alpha + 1} \quad (5)$$

where 10 log [Q(α)] is the directivity index.

Q is defined as the gain of a microphone array in a noise field over that of an omnidirectional microphone.

As can be seen from equation 5, when a null is steered towards a desired speech source by varying α, the directivity factor Q, which depends on alpha is altered as well.

The power in the second microphone $M_2$ is normalised relative to the power of the first microphone $M_1$ in order to mitigate near-field effects when constructing the forward and backward cardioid signals.

This is achieved by applying a gain G to the second microphone $M_2$.

This operation may be given by $$G(m) = \varepsilon\sqrt{\frac{\sum_{n=1}^{M} x_1^2(n)}{\sum_{n=1}^{M} x_2^2(n)}} + (1-\varepsilon)G(m-1) \quad (6)$$

where $x_1$ and $x_2$ are the signals fed to the beamformer, M is the block length, and ε is a smoothing parameter. This step makes the speech detector independent of microphone mismatch by scaling $x_2$ by G. A very small constant can also be added to the denominator of the first term in (6) to prevent division-by-zero.

A speech detector according to an embodiment of the invention may be used to detect speech from a point source positioned in either the front plane or the back plane. If the speech to be detected is in the front plane, then the output of the ADM is $y_f$. Similarly, if the speech to be detected emanates from a point source in the back plane, then the output of the ADM is $y_b$.

Depending on the location, one or both of the signals can be used for the detection process.

Let $c_f$ (n) and $c_b$ (n) denote the forward and backward cardioid signals, respectively, with sample index n. An ADM is constructed by finding the optimum $\beta_b$ that minimizes the mean-square error (MSE) of $$y_b(n)=c_f(n)-\beta_b c_b(n) \quad (7)$$

where β is an adaptive factor used to control the resulting adaptive differential microphone response. Different values of β produce different responses with nulls in specific locations.

It can be shown that the MSE is a quadratic function of $\beta_b$ and therefore displays a unique minimum at:

$$\beta_b = \frac{R_{fb}}{R_{bb}}, \tag{8}$$

with $R_{fb}=E\{c_f(n)c_b(n)\}$ the cross correlation between forward and backward cardioid signals, and $R_{bb}=E\{|c_b(n)|^2\}$ the power of the backward cardioids signal. For an interference located in the rear-half plane, the range of values for $\beta_b$ is [0,1]. Methods for estimating/adapting $\beta_b$ include a normalised least mean square (NLMS) form given by $$\beta_b(n+1)=\beta_b(n)+2\mu y(n)c_b(n)/|c_b(n)|^2, \tag{9}$$

where μ is the adaptation step-size, or a block-based approach and estimates the cross- and auto-correlation terms in (8) to estimate $\beta_b$, β can thus be estimated using either equation 8 or equation 9. $R_{fb}$, and $R_{bb}$ may be estimated using equations 10 and 11 below.

$$\hat{R}_{fb}(m) = \frac{\xi}{M}\sum_{n=1}^{M} c_f(n)c_b(n) + (1-\xi)\hat{R}_{fb}(m-1) \tag{10}$$

$$\hat{R}_{bb}(m) = \frac{\xi}{M}\sum_{n=1}^{M} c_b^2(n) + (1-\xi)\hat{R}_{bb}(m-1), \tag{11}$$

Where m is the block index, $\hat{R}_{fb}$ is an estimate of $R_{fb}$, $\hat{R}_{bb}$ is an estimate of $R_{bb}$, M, the block length, and ξ a smoothing parameter (0<ξ<1).

Equations 10 and 11 should therefore be used in conjunction with equation 8 if equation 8 is used to estimate β.

The above analysis assumes that the location of the desired speaker to be suppressed is in the rear-half plane, which spans the azimuthal range $\pi/2\leq\theta\leq 3\pi/2$. This analysis can also be repeated for a point source in the front-half plane ($-\pi/2\leq\theta\leq\pi/2$) using $$y_f(n)=c_b(n)-\beta_f c_f(n) \tag{12}$$

Using (4) and (7), the effective response of a resulting ADM can be written in terms of $\beta_b$ as $$V_b = \left(\frac{1-\beta_b}{2}\right) + \left(\frac{1+\beta_b}{2}\right)\cos\theta \tag{13}$$

which, for $0<\beta_b<1$, is a first-order differential response normalized to 1 in the forward direction (i.e. θ=0) with $$\alpha = \left(\frac{1-\beta_b}{2}\right) \tag{14}$$

Note the similarity to equation (4). The directional null of this response can be written in terms of $\beta_b$ by setting $V_b$ in (13) to zero, $$\theta_b = \arccos\left(\frac{\beta_b - 1}{1+\beta_b}\right). \tag{15}$$

The forward counterpart of the directional null in (15) can also be derived by assuming that the interference is in the front-half plane as in (12), and is given by $$\theta_f = \arccos\left(\frac{1-\beta_f}{1+\beta_f}\right). \tag{16}$$

Here, the value $\theta_f$ is defined for $\beta_f\geq 0$.

Thus by means of embodiments of the invention the directional null of the ADM response may be steered by appropriately varying β, the adaptive factor. When varying β, equation 8 or 9 above may be used.

In (15), as $\beta_b\rightarrow\infty$, $\theta\rightarrow 0°$ i.e. the null is placed in the front-half plane. In fact, for $\beta_b>1$, the direction of the steered null moves into the front half-plane. This means that even if a desired point source is not strictly located in the rear-half plane, it can still be detected.

In (16), as $\beta_f\rightarrow\infty$, $\theta\rightarrow 0°$ i.e. the null is placed in the rear-half plane. The condition relating $\beta_f$ and $\beta_b$ when $\theta_b=\theta_f$, can be found by equating (15) and (16), $$\beta_b\beta_f=1. \tag{17}$$

To place a null at 0°, requires a very large value for $\beta_b$, while placing a null at 180° requires a very large value for $\beta_f$. For a source in broadside, both $\beta_b$ and $\beta_f$ equal one, and the condition in (17) is satisfied.

FIG. 6 illustrates the directional response of an ADM according to an embodiment of the invention for various values of β.

If $\beta_b>1$, then the null is placed in the front-half plane at the cost of an absolute response of $\beta_b$ at 180°. In such situations, the relation in (17) also provides a method for calculating a value for $\beta_f$ that leads to a normalized first-order differential response. The value of $\beta_f=1/\beta_b$ together with (12) gives a normalized response at 0° with a null in the same direction in the front-half plane. This effect can be clearly seen in FIG. 4 where two directional responses exhibit the same null at approximately 71°, but one has a lower directivity factor (shown as a dashed line).

Speech may be detected using a ratio using $y_b(n)$ and another component of the processed signal, in particular, either an omnidirectional, monopole, or forward facing cardioid component of the processed signal. Desired speech is detected if $$\Lambda = \frac{|z(n)|^2}{|y(n)|^2} > \delta, \tag{18}$$

where δ is a positive threshold, and z(n) one of the aforementioned signals. The value of y(n) can be $y_b(n)$ and/or $y_f(n)$. In the following embodiment, z(n) is assumed to be the monopole signal.

In the absence of a desired speaker, and assuming a spherically isotropic noise field, the ratio in (18) is related to the directivity factor of a first-order response dependent on $\beta_b$. For a first-order response, (5) can be rewritten in terms of β (which applies to both $\beta_b$ and $\beta_f$) using (14) and (5), $$Q(\beta) = \frac{3}{\beta^2 - \beta + 1},\ 0 \leq \beta \leq 1. \tag{19}$$

The use of $Q(\beta)$ as a threshold to compare to $\Lambda$ is justified for $kd \ll \pi$, since only then can the directivity factor (in diffuse noise) of a monopole be shown to be unity. This is important because it makes comparing the ratio calculated in equation 18 to the adaptive threshold in (19) correct. In other words, the (theoretical) adaptive threshold in (19) assumes that the directivity of a monopole is unity in all directions. Furthermore, a monopole derived by summing up the two omni-directional microphone signals has a unity response only for $kd \ll \pi$)

The value of $\delta$ can be set to $$\delta=\sigma Q(\beta) \tag{20}$$

where a $\sigma \geq 1$ is an overcompensation factor.

It can be shown that the over-compensation factor $\sigma$ is related to Q and the signal-to-noise ratio (SNR). In fact the ratio of monopole to ADM power is shown to equal the product of Q and a term that depends on the SNR, $$\Lambda=(\sigma_S^2/\rho^2+1)Q(\beta), \tag{21}$$

where $\sigma_S^2$ is the power of the desired signal and $\rho^2$ is the power of the noise signal. This would mean that for an SNR of 0 dB ($\sigma_S^2=\rho^2$), $\sigma=2-\epsilon$ (where $\epsilon$ is a small constant) is an appropriate value of overcompensating the threshold. (Depending on the conditions, the value of $\sigma$ can be adjusted to the working conditions, i.e. to the sensitivity of the detector for large values of $\sigma$ is the detector is less sensitive while for lower values such as $\sigma=2-\epsilon$ the detector can be more sensitive).

Thus it can be seen that the adaptive threshold is also dependent on the value of $\beta$. This means that when the value of $\beta$ is changed in order to steer the null, the value of the adaptive threshold will also be modified. In other words different values of $\beta$ will result in different locations of the null(s) which means a different directivity pattern of the adaptive differential microphone (ADM). This in turn means a different directivity factor Q. As such the threshold should be adapted to get a 'fair' comparison. For example, if the null is steered so as to produce a hyper-cardioid response for the ADM, while the threshold uses a beta value from a cardioid response, then speech would be detected even in diffuse noise conditions. Therefore, the threshold is tailored to the current value of $\beta$ which determines the response of the ADM.

In addition, to increasing $\sigma$, a lower bound can be set for the value of $Q(\beta)$ in case the value of $\beta$ is not bounded between 0 and 1. A suitable value for this lower bound is 3, which corresponds to the minimum directivity factor for $\beta_b \in [0,1]$, i.e.

$$\delta = \sigma_b \max\left(3, \frac{3}{\beta_b^2 - \beta_b + 1}\right). \tag{22}$$

If the value of $\beta_b$ is greater than 1 (because a point source is in the front-half plane), for example, then with a lower bound, a quasi-penalty is applied to this source, making it more difficult to detect as speech. The greater the value of $\beta_b$ (and consequently the closer the directional null is to 0°) the higher the penalty incurred (in the form of a reduced directivity) as the value of $\Lambda$ decreases, while the minimum threshold value remains the same. The threshold values depend on $\beta$ as long as the resulting directivity factor in (22) is larger than 3 for this embodiment of the adaptive threshold. In equation (19) the threshold is automatically bounded below by 3 since we assume that $\beta$ is bounded between [0,1]. However, in the embodiment of (22) we only require that $\beta>0$. Since $\beta$ can therefore be $>1$, it should be bounded below.

Restricting the value of $\beta$ to a subinterval of [0,1] can be used when the possible location of a desired speaker is known to lie within a specific azimuthal range. In this case, (15) and (16) can be solved for $\beta_b$ and $\beta_f$ to drive the desired bounds.

BRIEF DESCRIPTION OF THE DRAWINGS

Embodiments of invention will now be further described by way of example only with reference to the accompanying drawings in which.

DETAILED DESCRIPTION

Figure 1:
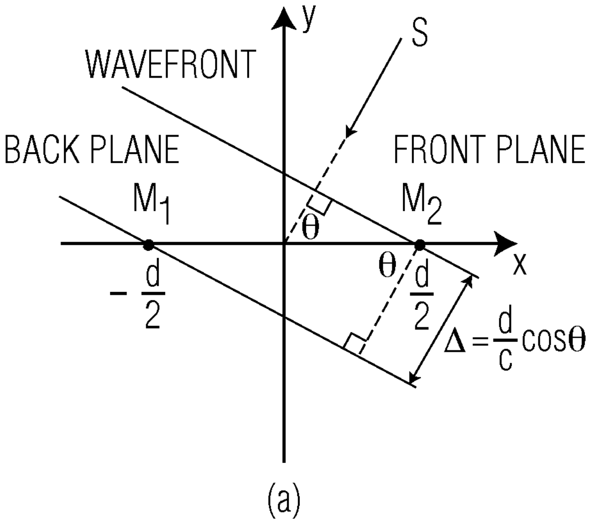
FIGS. 1 and 2 show a comparison of the delay for planar and spherical waves respectively.
Figure 2:
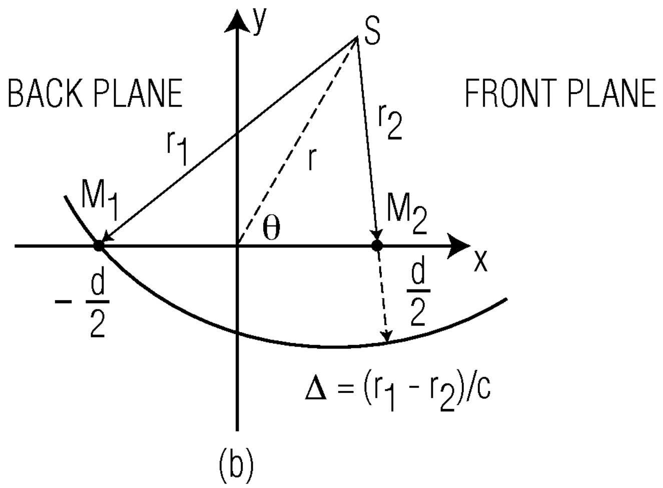
Figure 3:
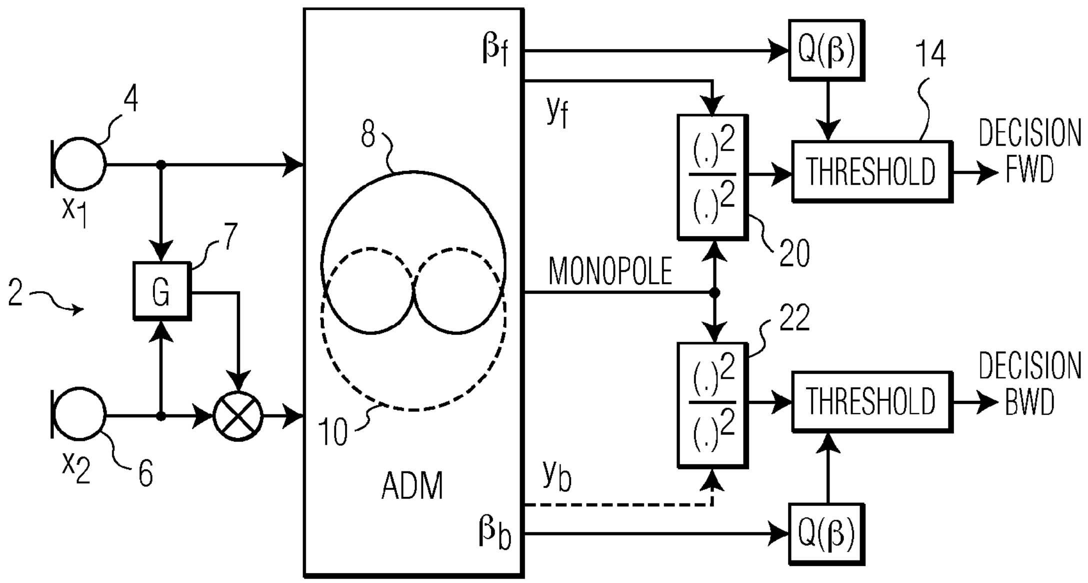
FIG. 3 is a schematic representation of an adaptive differential microphone according to a first embodiment of the invention.
Figure 4:
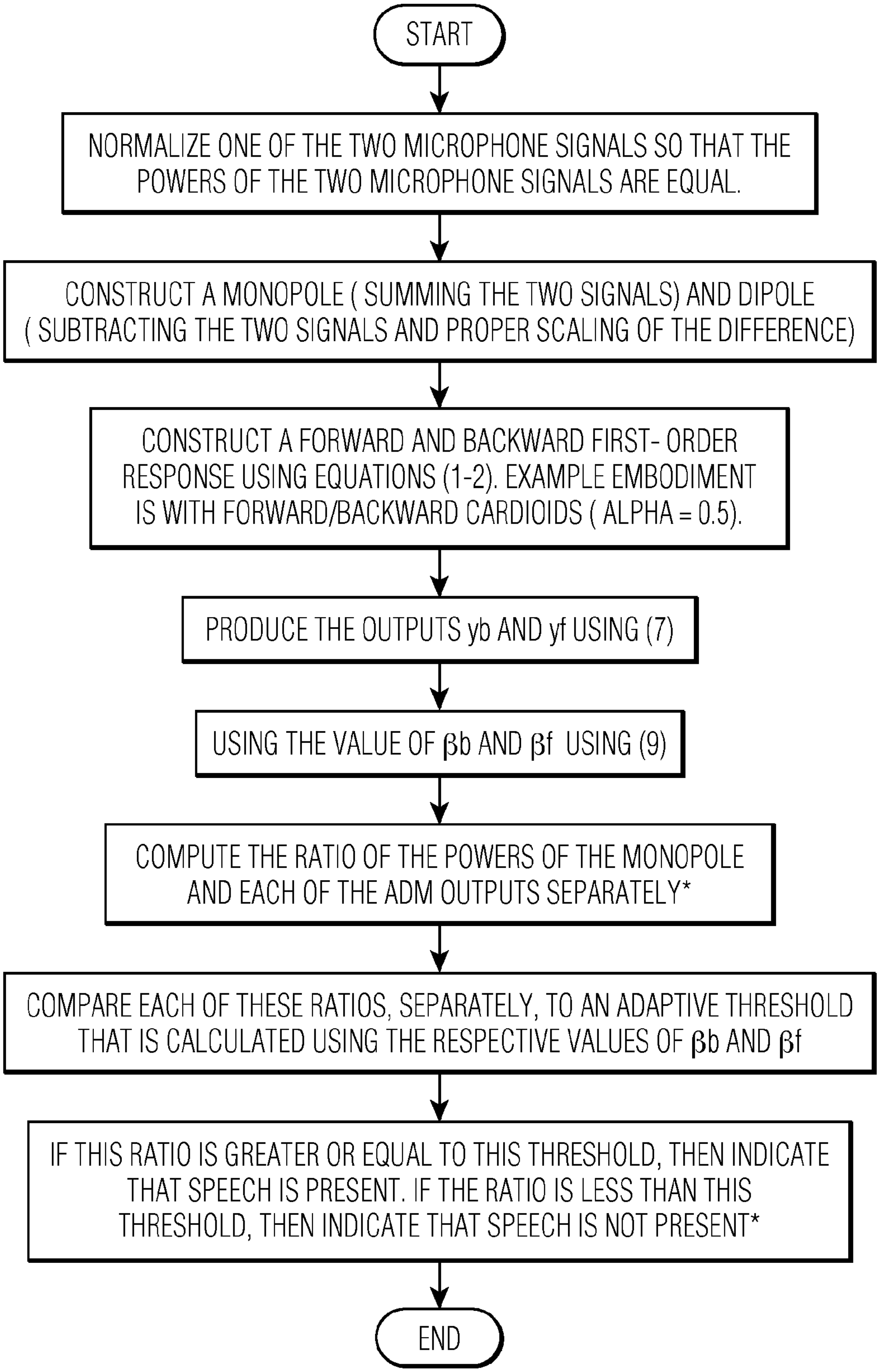
FIG. 4 is a flow chart illustrating a method of detecting speech using showing the ADM of FIG. 3.
Figure 5:
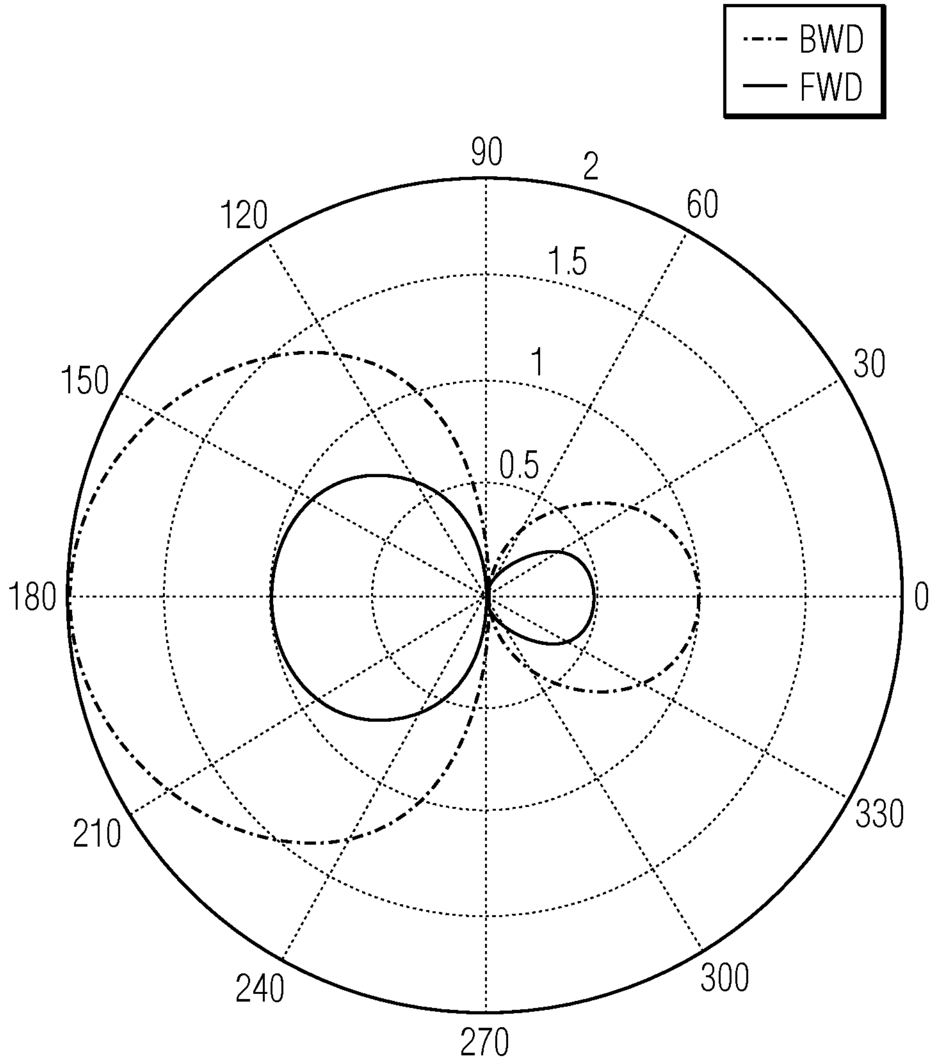
FIG. 5 is a polar plot illustrating two different responses of the ADM of FIG. 3 with a null in the same location.

Referring to FIGS. 3 and 4, a speech detector according to an embodiment of the invention is designated generally by the reference numeral 2. The speech detector comprises an adaptive differential microphone (ADM) constructed from a first microphone 4 and a second microphone 6. In this embodiment, each microphone 4, 6 comprises an omnidirectional microphone, although in other embodiments the microphones could be of a different type.

Microphone 4 is adapted to produce an electrical signal $x_1$ in response to a sound, and microphone 6 is adapted to produce a second electrical signal $x_2$ also in response to a sound.

The power of the second signal $x_2$ is normalised relative to the power of the first signal $x_1$ in order to mitigate near-field effects in constructing the forward and backward cardioid signals. This is achieved by applying a gain G to microphone 6 using amplifier 7 in accordance with equation (6) above. In other words, one microphone (in this case microphone 4) is used as a reference while in the other (in this case microphone 6) is scaled.

The signal from microphone 4 ($x_1$) and the normalised signal from microphone 6 are then processed to construct a first-order differential response comprising oppositely facing cardioids 8, 10. In other embodiments however the signals from the microphones 4, 6 may be processed to produce a different first-order response. The constructed first-order differential response comprises at least one directional null.

From the first-order differential response, two ADM outputs $y_f$ and $y_b$ are produced.

Output $y_f$ is the output of the ADM in the front plane, and output $y_b$ is the output of the ADM in the back plane.

As explained hereinabove the directivity of the ADM may be defined by a directional factor Q which is dependent on $\beta$ in accordance with equation 19 above. Directional factor Q is used to determine the value of an adaptive threshold 14 in accordance with equation 20.

A ratio is then computed of the power of the monopole component and the power of each of the outputs of the ADM separately to produce two ratios 20, 22.

A value of an adaptive factor β is then estimated from the two ratios using equation 9 above.

Each of the ratios is then compared separately to the value of the adaptive threshold 14 using the estimated values of $\beta_b$ and $\beta_f$ respectively. If either of these ratios is greater than or equal to the respective threshold 14, then speech is present. If the ratio is less than the threshold then this is an indication that the speech is not present is provided.

Depending on the outcome of these two comparisons, the system will make a decision as to whether speech has been detected in either the forward plane or the backward plane, or whether no speech has been detected. These steps will then be repeated for each input sample of sound input into the detector 2. Every time that the values of $\beta_b$ and $\beta_f$ are updated, the null of the first-order differential response will be re-orientated and may thus be steered to a target speech source. By updating the value of $\beta_b$ and $\beta_f$, the threshold values 14 are also adapted as explained hereinabove.

The adaptive factor β may be estimated using either equation 8 or equation 9 above. If equation 9 is used to estimate β, then equations 10 and 11 should also be used.

The parameter β will always be adapted in such a way as to produce ADM output $y_n$ with the smallest power. This is the case whether speech is present or absent.

Figure 6:
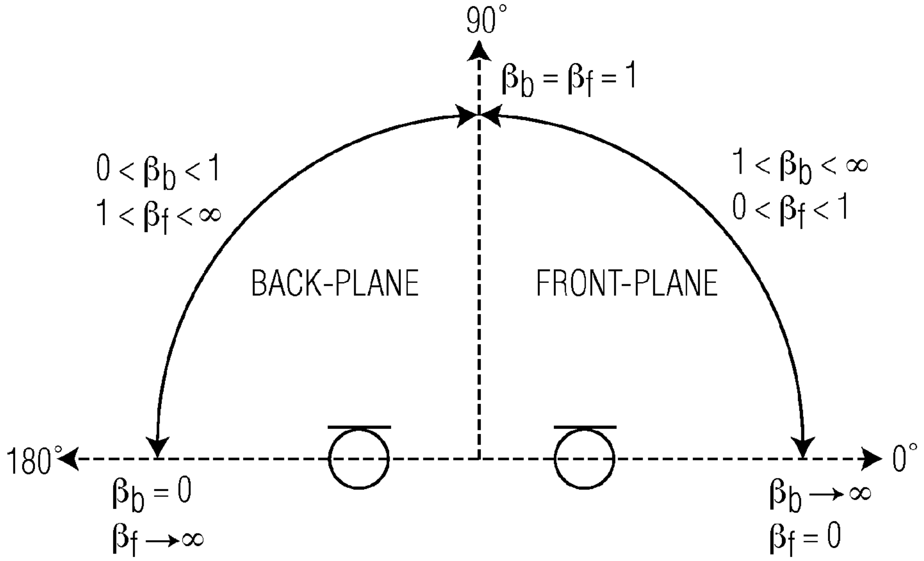
FIG. 6 is a polar plot showing the range of values of βb and βf depending on null placement in the front or back-half plane for the ADM of FIG. 3.

Turning now to FIG. 6 a second embodiment of the invention is designated generally by the reference numeral 60. Parts of the speech detector 60 corresponding to parts of a speech detector 2 illustrated in FIG. 3 have been given corresponding reference numerals for ease of reference. Speech detector 60 uses a discrete set of β values each of which is used to calculate an output signal from (7) and (12), the outputs of $\{\beta_f\}$ and $\{\beta_b\}$ are the minimum value of $y_f$ and $y_b$ and the corresponding values of β that produced it).

In this embodiment, therefore, the value of β is not estimated, but instead a discrete set of β having values between zero and 1, or some other upper limit other than 1 is specified. The appropriate value of β may thus be selected from the discrete set.

Figure 7:
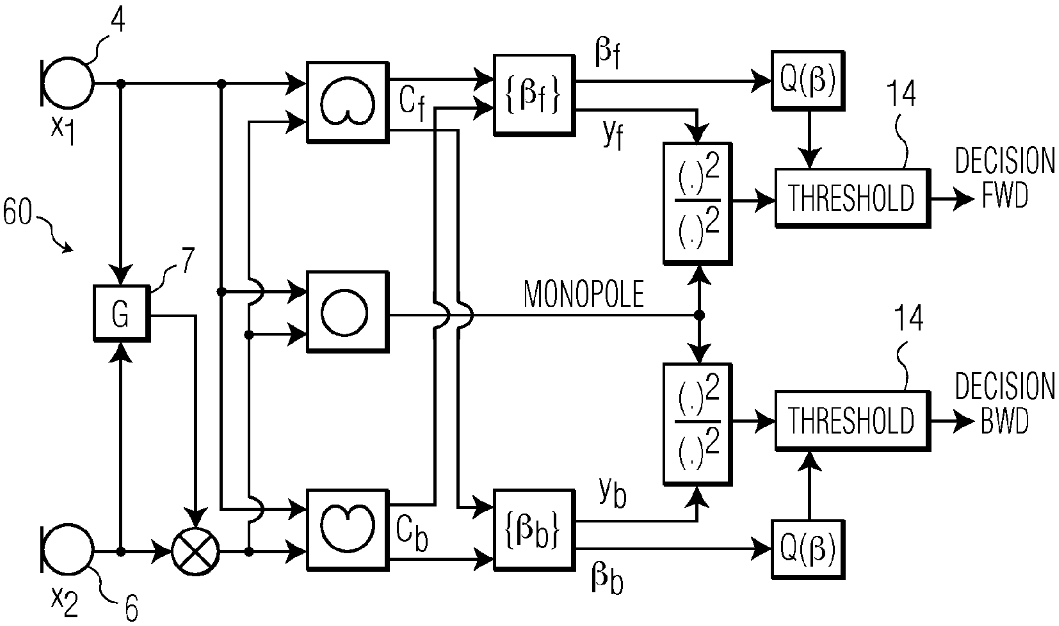
FIG. 7 is a schematic representation of an ADM according to a second embodiment of the invention.
Figure 8:
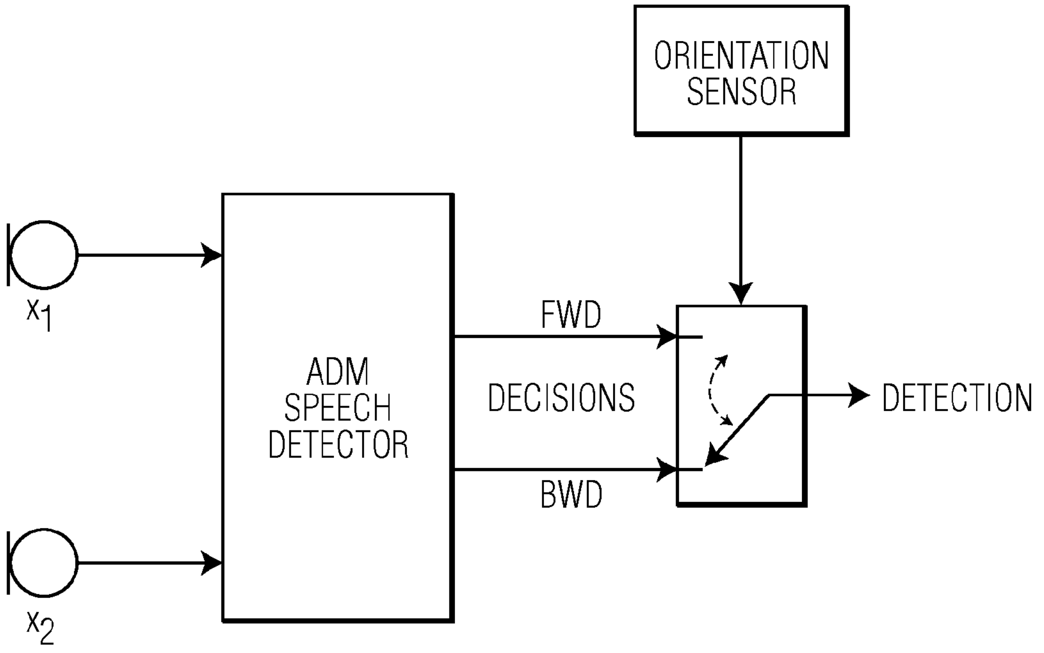
FIG. 8 is a schematic representation of an ADM according to a further embodiment of the invention comprising an orientation sensor.

Turning now to FIG. 7 a third embodiment of the invention is shown. FIG. 7 illustrates a speech detector 70 in which parts of the speech detector 70 which correspond to parts of the speech detector 2 have been given corresponding reference numerals for ease of reference.

The speech detector 70 is substantially the same as the speech detector 2 illustrated in FIG. 3. However, the speech detector 70 additionally comprises an orientation sensor 72 which is able to determine the orientation of a device such as a mobile phone in which the speech detector 70 is incorporated, relative to a user's mouth. The orientation sensor 72 can help decide which decision to rely on, i.e. whether to base the decision on the ratio calculated using the forward ADM response or the backward ADM response, since the orientation sensor will provide information as to whether the desired speech is in the forward plane or the backward plane.

The invention is not limited to an ADM comprising two microphones, and the robustness of the ADM will increase if more than two microphones are used.

The invention claimed is:

1. A method for detecting speech using a first microphone adapted to produce a first signal (x), and a second microphone adapted to produce a second signal ($x_2$), the method comprising:

providing a first microphone and a second microphone;

applying gain to the second signal to produce a normalised second signal, which signal is normalised relative to the first signal;

constructing one or more signal components from the first signal and the normalised second signal;

constructing an adaptive differential microphone (ADM) having a constructed microphone response constructed from the one or more signal components which response has at least one directional null;

producing one or more ADM outputs ($y_f$, $y_b$) from the constructed microphone response in response to detected sound;

computing a ratio of a parameter of either one of the one or more signal components or the constructed microphone response to a parameter of an output of the ADM; comparing the ratio to an adaptive threshold value; detecting speech if the ratio is greater than or equal to the adaptive threshold value.

2. A method according to claim 1 comprising:

estimating a value of an adaptive value β.

3. A method according to claim 1 further comprising the following:

adapting the value of the adaptive factor β;

recomputing the ratio;

comparing the recomputed ratio to an adapted threshold value;

detecting speech if the ratio is greater than the adapted threshold value.

4. A method according to any one of claim 1 wherein the step of computing a ratio comprises computing a ratio from the power of either a signal component or a constructive microphone response to the power of an output of the ADM.

5. A method according to claim 1 wherein the step of computing a ratio comprises computing a ratio from an absolute value of either a signal component or a constructive microphone response to the absolute value of an output of the ADM.

6. A method according to claim 1 wherein the output of the ADM comprises a first output $y_b$ produced in response to sound detected in a back plane, and a second output $y_f$ produced in response to sound detected in a front plane.

7. A method according to claim 6 wherein the step of preparing a ratio comprises computing a ratio of a parameter of either a first signal component or a constructive microphone response to a parameter of the first output of the ADM; and computing a second ratio of a parameter of either a first signal component or a constructive microphone response to a parameter of the second output of the ADM;

the method further comprising comparing separately the first ratio and the second ratio to an adaptive threshold value; and making a decision as to whether a speech source is positioned in a forward or backward plane.

8. A method according to claim 1 wherein constructing one or more signal components from the first signal and the normalised second signal comprises constructing a monopole signal and dipole signal from the first signal and the normalised second signal.

9. A method according to claim 8 wherein the first response comprises a forward facing cardioid signal and the second response comprises a backward facing cardioid signal.

10. A method according to claim 1 wherein the constructed microphone response comprises a first response and a second response.

11. A speech detector comprising:

a first microphone adapted to produce a first signal ($x_1$);

a second microphone adapted to produce a second signal ($x_2$);

an amplifier adapted to apply a gain to the second signal to produce a normalised second signal, which signal is normalised relative to the first signal;

a first processor for constructing one or more signal components from the first and normalised second signals;

a second processor for constructing an adaptive differential microphone (ADM) having a constructed microphone response comprising at least one directional null, the ADM producing one or more outputs in response to detected sound;

a third processor for computing a ratio of a parameter of either one of the one or more signal components or the constructed microphone response to a parameter of an output of the ADM;

a comparator for comparing the ratio to an adaptive threshold to detect if the ratio is greater than or equal to a value of an adaptive threshold; and a detector for detecting speech when the ratio is greater than, or equal to the value of adaptive threshold.

12. A speech detector according to claim 11 wherein the one or more signal components comprise a monopole signal and dipole signal.

13. A speech detector according to claim 11 wherein the constructive microphone response comprises a forward facing cardioid signal and a backward facing cardioid signal.

14. A speech detector according to claim 11 wherein the first, second and third processors comprise a single processor.

15. A speech detector according to claim 11 wherein each of the first and second microphones comprises an omnidirectional microphone.

16. An adaptive differential microphone forming a speech detector according to claim 11.

* * * * *